United States Patent
Messina et al.

(10) Patent No.: US 8,234,848 B2
(45) Date of Patent: Aug. 7, 2012

(54) ROBOTIC MOWER HEIGHT OF CUT ADJUSTMENT ASSEMBLY

(75) Inventors: Thomas M. Messina, Charlotte, NC (US); Paul M. Elhardt, Charlotte, NC (US); John D. Mouser, Cornelius, NC (US)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 12/845,094

(22) Filed: Jul. 28, 2010

(65) Prior Publication Data

US 2012/0023880 A1 Feb. 2, 2012

(51) Int. Cl.
*A01D 34/00* (2006.01)
(52) U.S. Cl. .......................................................... 56/17.1
(58) Field of Classification Search ................... 56/17.1, 56/17.2, 320.1; 403/118; 411/327–329, 411/437, 546, 535
See application file for complete search history.

(56) References Cited

U.S. PATENT DOCUMENTS

| | | | | |
|---|---|---|---|---|
| 2,484,201 A | * | 10/1949 | Winchell | 56/17.1 |
| 2,796,715 A | * | 6/1957 | Meltzer | 56/17.2 |
| 3,114,229 A | * | 12/1963 | Wilson | 56/11.8 |
| 4,694,639 A | | 9/1987 | Chen et al. | |
| 4,777,785 A | | 10/1988 | Rafaels | |
| 7,117,660 B1 | | 10/2006 | Colens | |
| 7,599,758 B2 | | 10/2009 | Reindle et al. | |
| 2009/0183482 A1 | * | 7/2009 | Cheung | 56/17.1 |

FOREIGN PATENT DOCUMENTS

EP 1642488 4/2006

OTHER PUBLICATIONS

KA LawnBott. Product Brochure. Kyodo America, KA Home Robotics. Lawrenceville, GA. <URL:http://www.lawnbott.com/>.

* cited by examiner

*Primary Examiner* — Alicia Torres

(57) ABSTRACT

A height of cut adjustment assembly for a robotic mower includes a height of cut drum secured to a bottom chassis of the robotic mower and having internal spiral threads, a motor cup supporting a cutting blade motor and having external spiral threads that engage the height of cut drum, and a blade shield fastened to the motor cup. The blade shield and the motor cup may be rotated to change height of cut. The blade shield and motor cup may be rotated one revolution to move the motor cup and blade shield vertically between a minimum and a maximum cutting height. Detents engage the motor cup with the drum at a plurality of different cutting heights.

13 Claims, 6 Drawing Sheets

ROBOTIC MOWER HEIGHT OF CUT ADJUSTMENT ASSEMBLY

FIELD OF THE INVENTION

This invention relates to robotic lawn mowers, and specifically to a height of cut adjustment assembly for a robotic mower.

BACKGROUND OF THE INVENTION

Robotic mowers may be required to cut grass and various different cutting heights. A height of cut adjustment assembly for a robotic mower is needed that an operator may use to change the cutting height without tools. A height of cut adjustment assembly is needed that is light weight, low cost, and relatively simple and fast to operate. A height of cut adjustment assembly is needed that can be secured at various different cutting heights, from less than one inch to at least four inches.

SUMMARY OF THE INVENTION

A robotic mower height of cut adjustment assembly includes a cylindrical height of cut drum, and a blade motor mounted in a motor cup that engages the height of cut drum at a plurality of different cutting heights. Each cutting height may be defined and secured by detents that are engaged by rotating the motor cup relative to the height of cut drum.

DESCRIPTION OF THE PREFERRED EMBODIMENT

Figure 1:
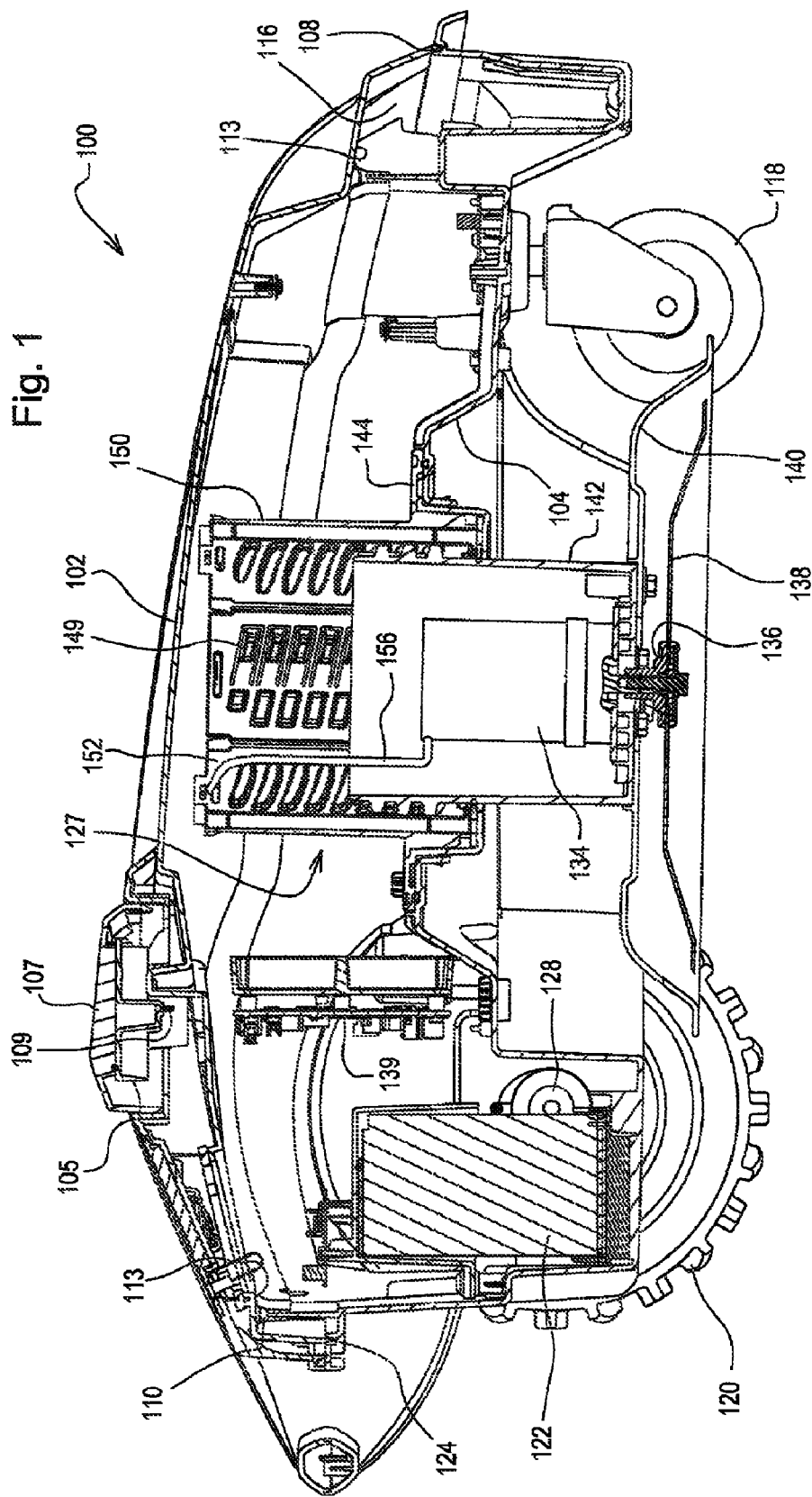
FIG. 1 is a side cross section view of a robotic mower according to a preferred embodiment of the invention.

In one embodiment shown in FIG. 1, robotic mower 100 may be powered by battery pack 122 that may be charged periodically using a charging station. Battery pack 122 may store electrical energy used to operate a pair of variable speed electric motors 128 to turn a pair of traction drive wheels 120, rotate cutting blade 138, and power vehicle control unit 139 that may be programmed to command electric traction wheel motors 128 and operate functions of the robotic mower. Each traction wheel motor may be a DC brushed or DC brushless motor that controls one of the wheels.

Figure 3:
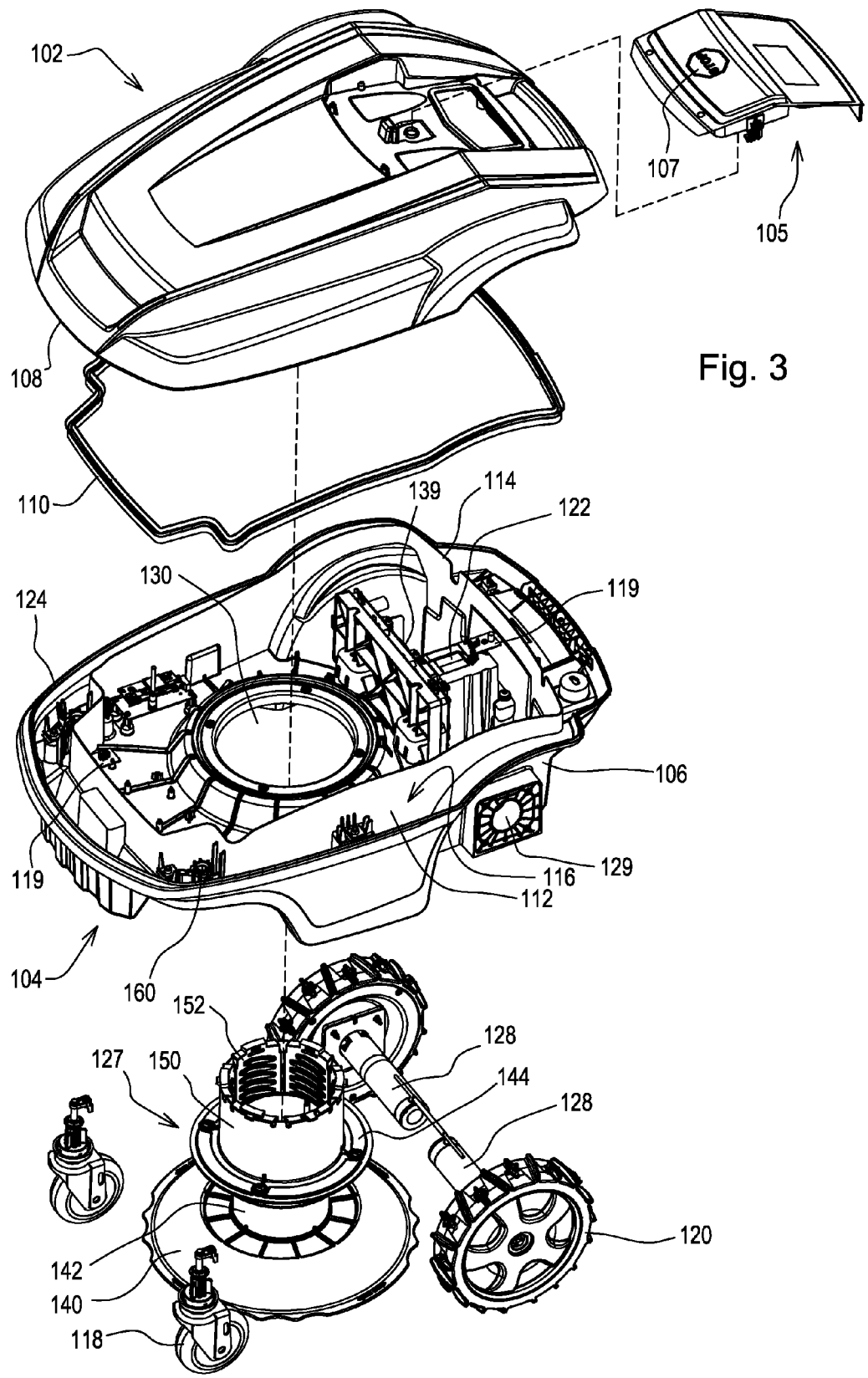
FIG. 3 is an exploded perspective view of a robotic mower according to a preferred embodiment of the invention.

In one embodiment shown in FIGS. 1 and 3, top cover 102 may be removably attached and secured to bottom chassis 104. Control panel 105 may be removably attached to the top cover, and the control panel may be connected to the vehicle control unit for an operator to enter various commands using a keypad. A seal may be provided between the control panel and the top cover. Additionally, a stop button may be provided on the control panel. The stop button may be connected to the vehicle control unit to command the traction wheel motors and blade motor to stop. Preferably, the stop button may be connected to the vehicle control unit through magnet 109, without a wired connection extending outside of the top cover.

In one embodiment, bottom chassis may have a pair of walls, an outer wall 106 and an inner wall 112, to define an outer cavity 116 and an inner cavity 117. The top cover may be attached to and cover the bottom chassis, and may form a seal with the outer wall and the inner wall to fully enclose each of the inner and outer cavities. Electronics and/or other critical components may be housed inside the inner cavity of the robotic mower. Inner cavity 117 has two barriers preventing moisture, dust, debris and other contaminants from reaching sensitive components and wired connections including electronic controller 139, battery pack 122, and one or more boundary sensors 119.

Figure 2:
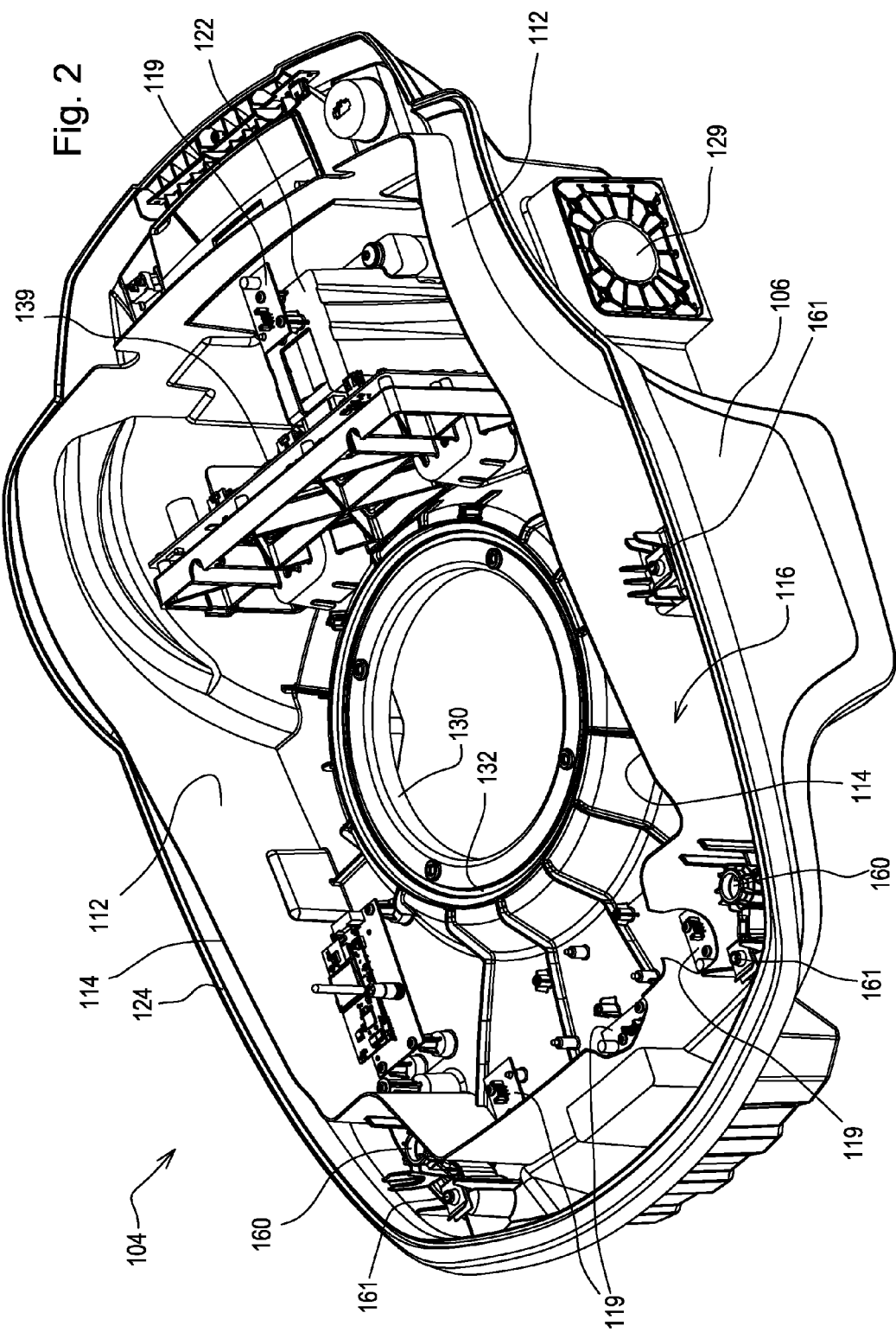
FIG. 2 is a top perspective view of the bottom chassis of a robotic mower according to a preferred embodiment of the invention.

In the embodiment shown in FIGS. 2 and 3, outer cavity 116 may be provided between outer wall 106 and inner wall 112 of the robotic mower. Components that are less sensitive to moisture or dust may be housed in outer cavity 116. For example, the components in outer cavity 116 may include mounting clips 161 that may removably attach and lock the top cover onto the bottom chassis, and spindle mounting brackets 160 for caster wheels 118.

In one embodiment, outer wall 106 may have a groove or channel 124 along its peripheral upper edge. Outer rim 108 of the top cover may engage and fit into groove or channel 124 and may form an outer seal with the groove or channel. Additionally, flexible elastomeric seal 110 may be positioned on inner wall 112 of the bottom chassis and may form a seal when it engages the top cover. The flexible elastomeric seal 110 may be positioned on the upper edge 114 of the inner wall and seal with surface 113 of the top cover to provide a water tight seal. Preferably, the lips of the flexible elastomeric seal may be compressed against surface 113 as the top cover is secured to the bottom chassis.

Figure 6:
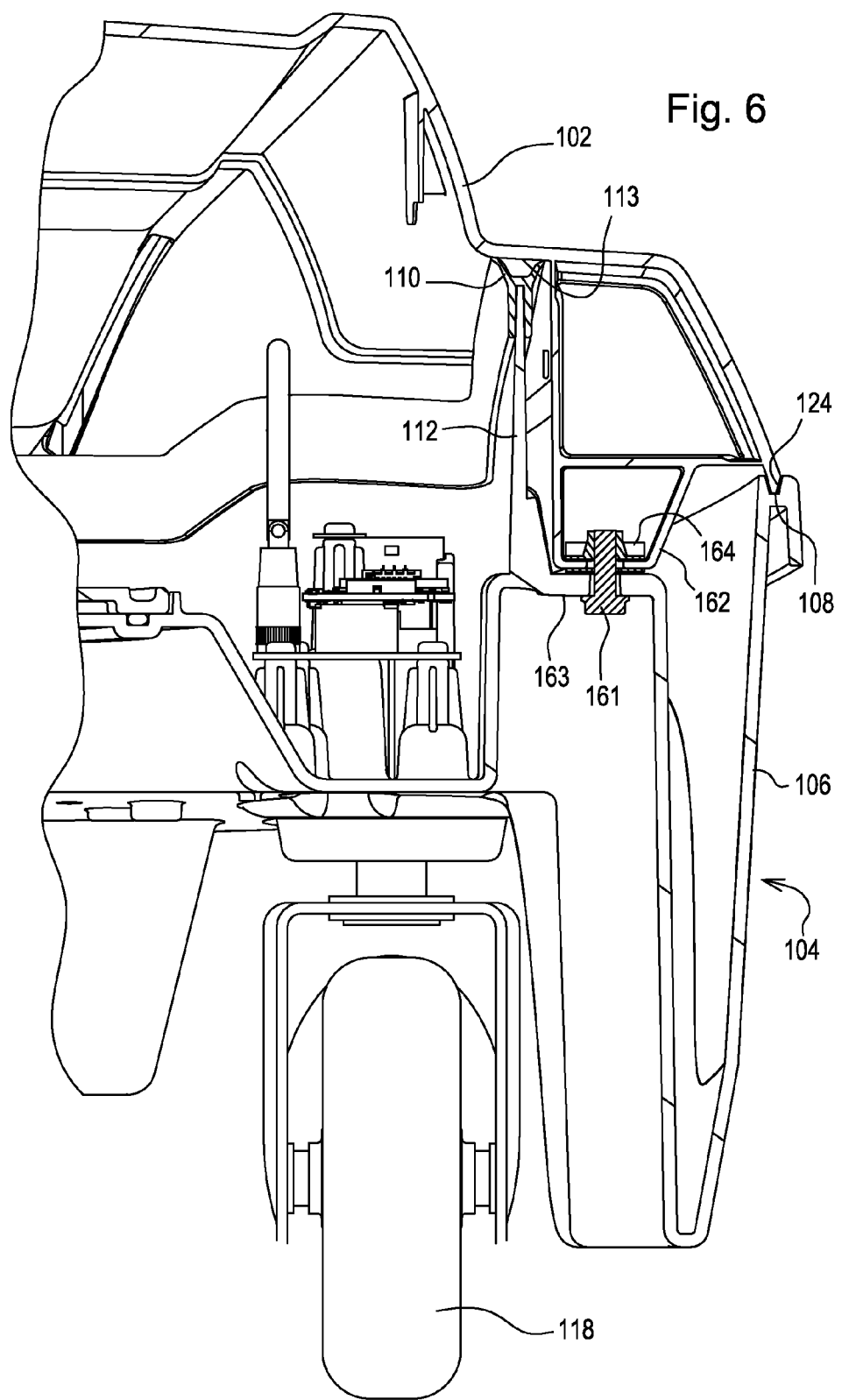
FIG. 6 is a cross section view of a portion of the bottom chassis and top cover of a robotic mower according to a preferred embodiment of the invention.

In one embodiment shown in FIG. 6, the top cover may be secured to the bottom chassis with a plurality of mounting clips or fasteners 161 extending between the bottom chassis and top cover, and may be tightened by threading or snap fit into nuts or retainers 164. Each mounting clip or fastener may extend through an opening in one of a plurality of mounting platforms 163 in the bottom chassis, and may engage a nut or retainer captured in a mounting platform 162 on the top cover. Each mounting clip may be accessible from the underside of the bottom chassis to attach, remove or tighten the top cover to the bottom chassis.

Figure 4:
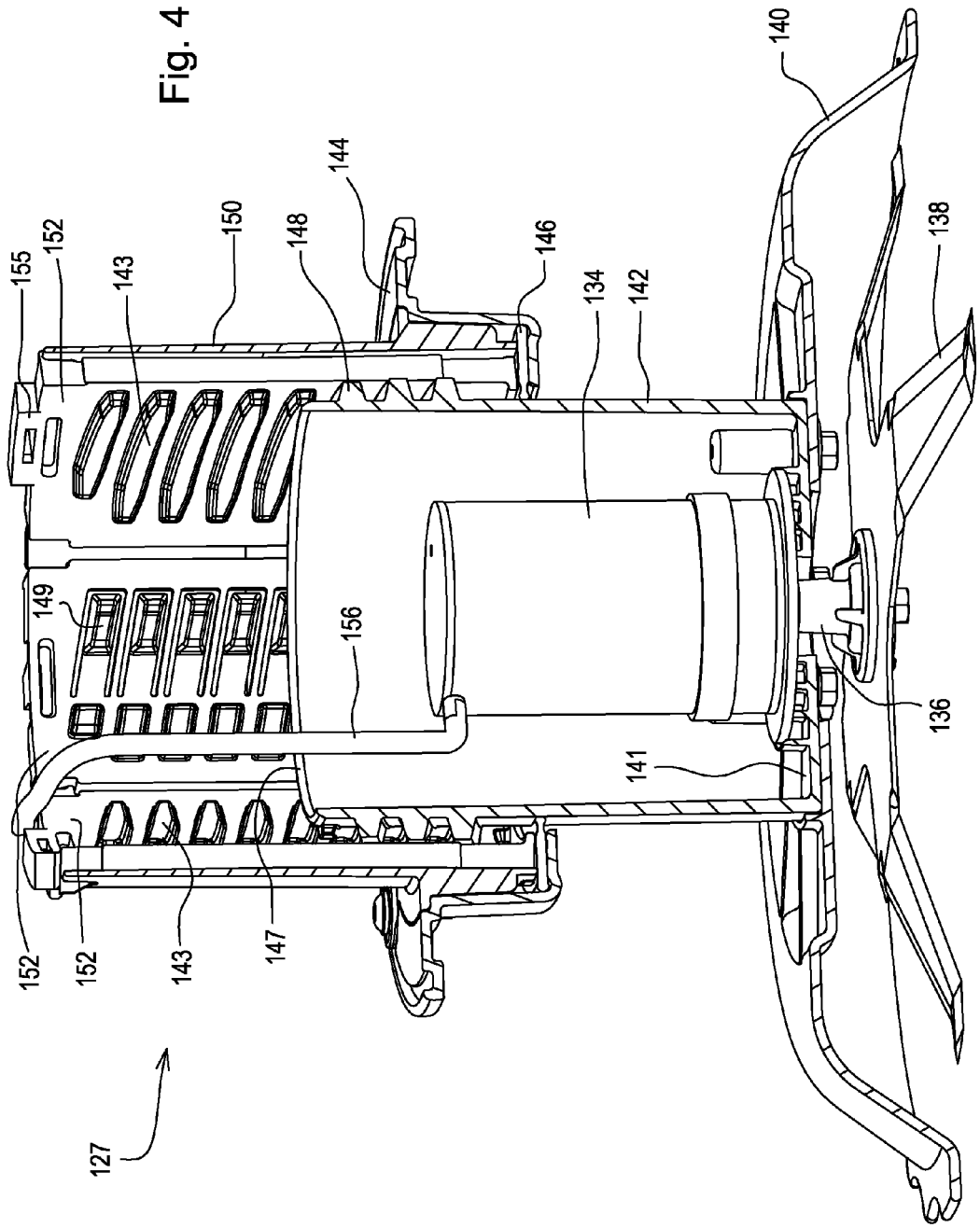
FIG. 4 is a side cross section view of a height of cut adjustment assembly according to a preferred embodiment of the invention.

In one embodiment shown in FIGS. 1, 3 and 4, height of cut adjustment assembly 127 may be mounted to the bottom chassis so that it may extend through height of cut adjustment assembly hole 130. The height of cut adjustment assembly may include height of cut drum 150 which may be secured to the bottom chassis with mounting flange 144. An O-ring seal may be positioned in groove or channel 132 around the perimeter of the height of cut adjustment assembly hole to provide a seal between the mounting flange and the bottom chassis. Additionally, ring 146 may be provided between the mounting flange and height of cut drum 150.

Still referring to FIGS. 1, 3 and 4, in one embodiment, blade motor 134 may be mounted on the inside lower end surface 141 of height of cut motor cup 142. The blade motor may be a direct driven electric motor connected to shaft 136 and cutting blade 138, and may be electrically connected to the controller by flexible cable 156 so that the blade motor may be raised and lowered as the height is adjusted. The cutting blade may include one or more horizontal cutting surfaces, and four cutting surfaces are shown in a preferred embodiment. The height of cut motor cup may be a generally cylindrical cup-shaped member, and the lower end of the height of cut motor cup may be mounted to blade shield 140. The height of cut motor cup may have a substantially greater height and diameter than the blade motor to provide sufficient air volume and circulation to avoid overheating the blade motor.

In one embodiment, an operator may manually raise and lower the blade shield and motor cup assembly to change the cutting height of the robotic mower. To change the height of cut, the operator may rotate the blade shield and motor cup to each desired cutting height. Motor cup 142 may have spiral threads 148 around at least part of its external circumference, preferably near its open upper end 147. The spiral threads 148 on the height of cut motor cup may engage spiral threads 143 on the height of cut drum so the motor cup and blade shield may move upwardly or downwardly by clockwise or counterclockwise rotation relative to the height of cut drum. Detents 149 may be provided along the spiral threads of the height of cut drum to hold and maintain the motor cup and blade shield at each height position selected by the operator.

Figure 5:
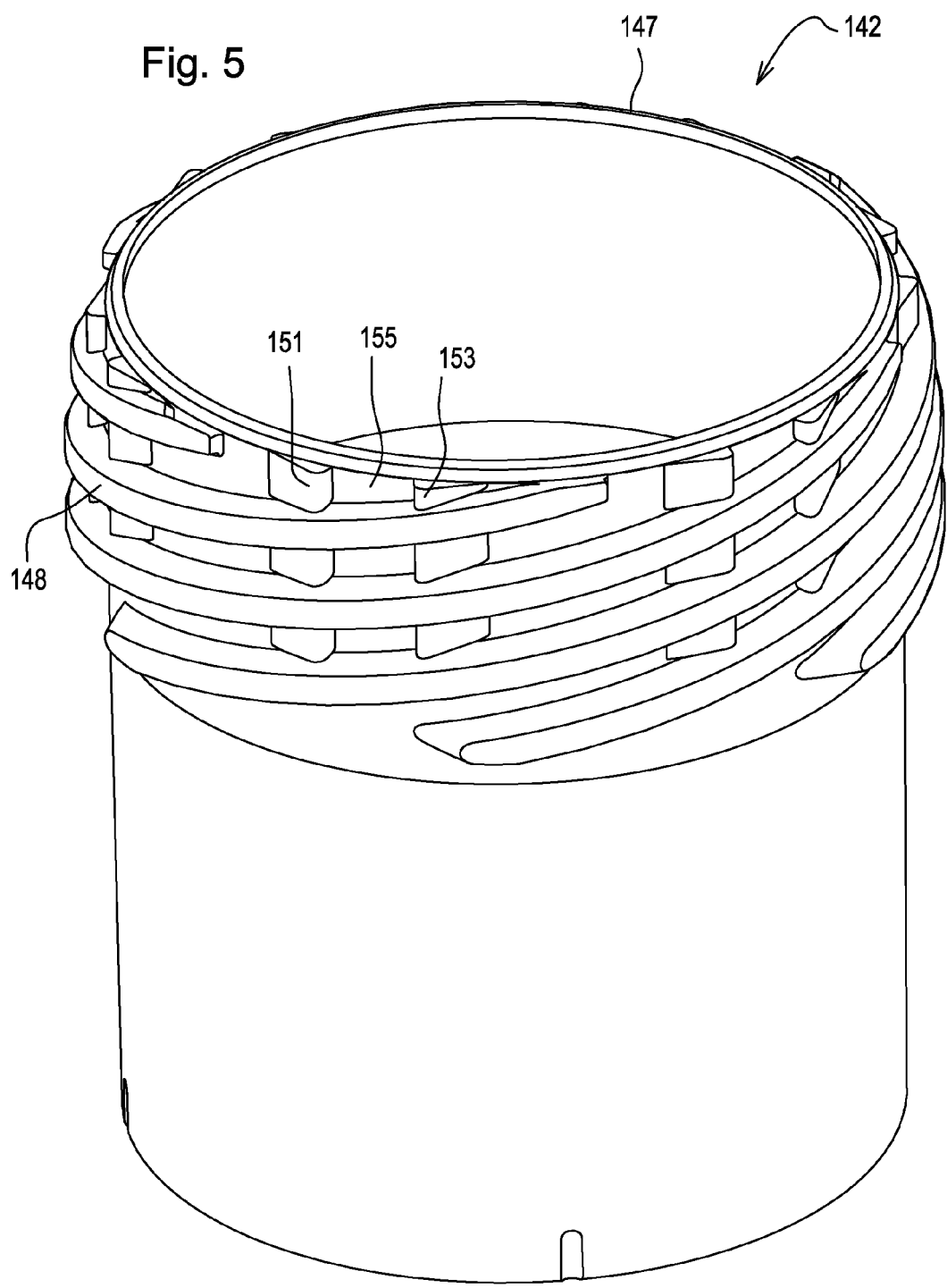
FIG. 5 is a perspective view of a motor cup for a robotic mower height of cut adjustment assembly according to a preferred embodiment of the invention.

As shown in FIG. 5, in one embodiment, detents 149 may enter and be captured in gaps 155 between each pair of ramps 151, 153 on the spiral threads 148 on the outside of the motor cup. The gaps may be spaced at regular intervals around the spiral thread path of the motor cup. The detents may flex radially outwardly to slide up each ramp 151 or 153 until the detent reaches a gap 155. The detent then may flex back radially inwardly to snap into and engage the gap. Additionally, each detent may have rounded edges so that it can slide into or disengage from each gap without hanging up, upon application of torque by the operator.

Now referring to FIGS. 4 and 5, in one embodiment, threads 143 and detents 149 for the height of cut drum may be provided on a plurality of removable plastic blow molded inserts 152. The inserts may be positioned and fastened to the inside surface of the height of cut drum by clips 155. For example, six inserts 152 may be provided in the height of cut drum, with each insert extending about 60 degrees around the inner circumference of the drum. Each of the six inserts may include its own thread start at its upper and lower ends, and the motor cup may have six thread starts so that it may engage all of the inserts at once. Additionally, the threads may have a pitch sufficiently great so that in one revolution, the motor cup and blade shield may move vertically at least about three inches, and preferably at least about four inches, between minimum and maximum cutting heights. For example, one revolution of the height of cut adjustment assembly may adjust between a minimum cutting height of less than about one inch, and a maximum cutting height of at least about four inches. Limiting the height of cut adjustment assembly to one revolution also reduces or prevents twisting or winding of power cable 156 to the motor.

Having described the preferred embodiment, it will become apparent that various modifications can be made without departing from the scope of the invention as defined in the accompanying claims.

The invention claimed is:

1. A robotic mower height of cut adjustment assembly, comprising:
 a height of cut drum secured to a bottom chassis of the robotic mower and having an internal circumferential surface with spiral threads having detents;
 a motor cup supporting a cutting blade motor and having an external circumferential surface with spiral threads that engage the height of cut drum, the spiral threads on the motor cup having detents;
 a blade shield fastened to the motor cup;
 the blade shield and the motor cup are rotatable to change height of cut, the detents on the height of cut drum engaging the detents on the motor cup to hold and maintain the blade shield and motor cup at a plurality of different heights of cut.

2. The robotic mower height of cut adjustment assembly of claim 1 wherein the blade shield and motor cup are rotatable one revolution to move the motor cup and blade shield vertically between a minimum and a maximum cutting height.

3. The robotic mower height of cut adjustment assembly of claim 1 further comprising a plurality of inserts into the height of cut drum.

4. The robotic mower height of cut adjustment assembly of claim 1 wherein the spiral threads on the internal circumferential surface and the spiral threads on the external circumferential surface each have a plurality of thread starts.

5. The robotic mower height of cut adjustment assembly of claim 1 wherein the detents flex radially outwardly to slide up a plurality of ramped surfaces on the external threads of the motor cup, and flex radially inwardly into gaps between the ramped surfaces.

6. A robotic mower height of cut adjustment assembly, comprising:
 a cylindrical height of cut drum mounted to and extending through an opening in a bottom chassis;
 a blade motor mounted in a motor cup and engaging the height of cut drum at a plurality of different cutting heights, each cutting height defined by detents in a helical thread path on the motor cup and on the height of cut drum that engage to hold and maintain the motor cup relative to the height of cut drum at a plurality of cutting heights.

7. The robotic mower height of cut adjustment assembly of claim 6, wherein the motor cup is rotatable a maximum of about one revolution to change the cutting height from a lowest position to a highest position.

8. The robotic mower height of cut adjustment assembly of claim 6 further comprising a blade shield mounted to the motor cup.

9. The robotic mower height of cut adjustment assembly of claim 6 further comprising a plurality of plastic inserts positioned in the height of cut drum, each insert engaging the motor cup at every cutting height between a maximum and a minimum cutting height.

10. A robotic mower height of cut adjustment assembly, comprising:
 an electric motor having a vertical shaft attached to a cutting blade, the motor mounted in a motor cup, the motor cup having a threaded external circumferential surface engaged to a threaded internal circumferential surface of a height of cut drum so that the motor cup is rotatable with respect to the drum to raise and lower the motor cup, and
 a plurality of detents along the threaded surfaces of the motor cup and drum that engage to hold and maintain the motor cup relative to the drum at a plurality of different heights of cut.

11. The robotic mower height of cut adjustment assembly of claim 10, further comprising a blade shield mounted to the motor cup.

12. The robotic mower height of cut adjustment assembly of claim 10, wherein the motor cup has a plurality of thread starts that engage the height of cut drum.

13. The robotic mower height of cut adjustment assembly of claim 10, wherein the motor cup is rotatable one revolution to move vertically from a lowest position to a highest position.

* * * * *